United States Patent [19]

Kobari et al.

[11] 4,434,393
[45] Feb. 28, 1984

[54] INDUCTION MOTOR CONTROL SYSTEM

[75] Inventors: Katsuo Kobari, Tachikawa; Hiroshi Ishida, Hamura; Naoto Ota, Hino, all of Japan

[73] Assignee: Fujitsu Fanuc Limited, Kawasaki, Japan

[21] Appl. No.: 388,926

[22] Filed: Jun. 16, 1982

[30] Foreign Application Priority Data

Jun. 16, 1981 [JP] Japan ................................. 56-92795

[51] Int. Cl.³ ....................... H02P 7/62; H02M 5/458
[52] U.S. Cl. ..................... 318/757; 318/762; 363/58
[58] Field of Search .............. 318/757, 759–762, 318/741–743, 345 CB, 376, 803, 807–811; 363/58, 57, 137, 138

[56] References Cited

U.S. PATENT DOCUMENTS

| | | | |
|---|---|---|---|
| 4,183,081 | 1/1980 | Cutler et al. | 363/58 |
| 4,230,979 | 10/1980 | Espelage et al. | 318/758 |
| 4,295,086 | 10/1981 | Cutler et al. | 318/759 |
| 4,319,177 | 3/1982 | Kawada et al. | 318/803 |
| 4,328,454 | 5/1982 | Okuyama et al. | 318/803 |
| 4,353,023 | 10/1982 | Kawada et al. | 318/803 |
| 4,385,267 | 5/1983 | Herbert et al. | 318/762 |

FOREIGN PATENT DOCUMENTS 26039 11/1980 European Pat. Off. .
26038 11/1980 European Pat. Off. .
2000397 6/1978 United Kingdom .

OTHER PUBLICATIONS

IEEE Transactions on Industry Applications, vol. IA-14, No. 4, Jul./Aug. 1978, New York, U.S.A., J. W. A. Wilson, "Inverter Motor Drive", pp. 330 to 335.

Primary Examiner—J. V. Truhe
Assistant Examiner—A. Evans
Attorney, Agent, or Firm—Staas & Halsey

[57] ABSTRACT

A control circuit for driving an induction motor wherein an AC voltage is converted into a direct current by a rectifying circuit and the direct current is converted into a signal having a variable voltage and frequency by a transistor inverter connected in parallel with a smoothing capacitor, and a regenerative circuit is connected in parallel with the inverter, and a circuit is provided for comparing the terminal voltage $V_C$ of the smoothing capacitor and a reference voltage $V_r$ when braking is to take place is disclosed. When condition $V_C \geq V_r$ exists, the transistor inverter is disabled but the regenerative circuit is allowed to operate; when the condition $V_C < V_r$ exists, the transistor inverter is operated in the regenerative braking mode.

3 Claims, 7 Drawing Figures

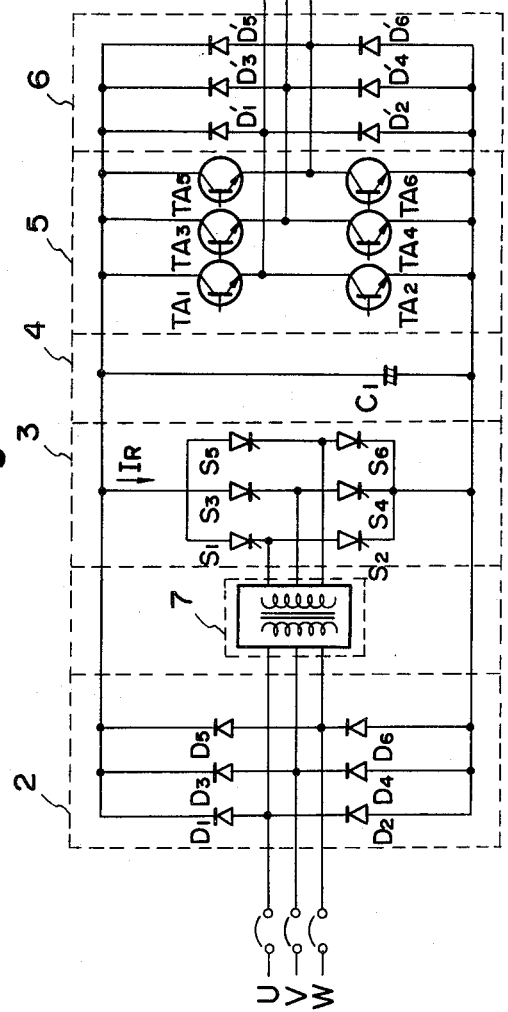
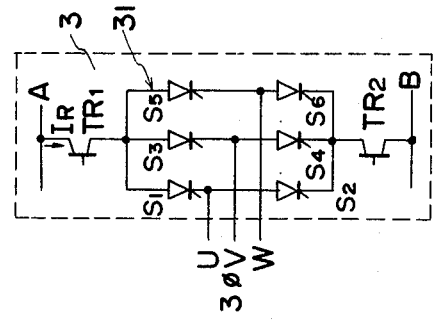
Fig.1(A) PRIOR ART
Fig.1(B) PRIOR ART

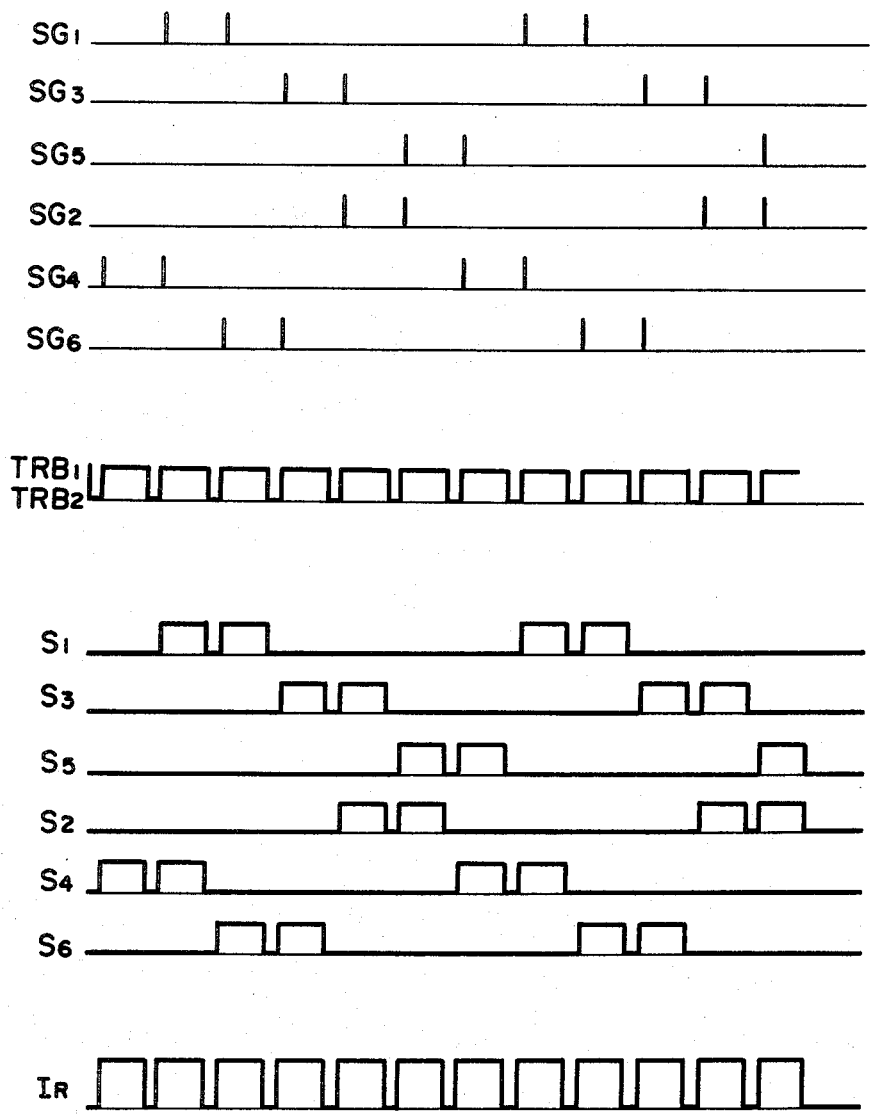

INDUCTION MOTOR CONTROL SYSTEM

CROSS REFERENCE TO RELATED APPLICATIONS

This application is related to U.S. application Ser. No. 388,924, entitled "Induction Motor Control System", and is assigned to the same assignee as the above-noted application.

BACKGROUND OF THE INVENTION

1. Field of the Invention

This invention relates to an induction motor control system and, more particularly, to an induction motor control system which enables an induction motor to continue running even when there is a large increase in regenerative energy, and which performs regenerative braking with excellent efficiency.

2. Description of the Prior Art

Induction motors are employed in a variety of industrial fields and can be applied to a variety of loads. Some induction motors undergo rapid and frequent increases and decreases in speed, while in others there are positive and negative changes in load torque, such as when used in raising and lowering an object via a hoist. Thus there is a requirement that an induction motor functioning as a driving source be operated so as to generate a positive torque as well as a braking torque.

A method of controlling the operation of induction motors which has recently come into fairly widespread use employs a variable voltage-variable frequency inverter. While no major problems are encountered in this method when operating the motor in the driving mode, one difficulty which does arise is the manner of dealing with the rotational energy possessed by the rotor of the motor when operating the motor in the braking mode at the time of a reduction in speed. Two exemplary methods of dealing with this rotational energy have been adopted in the prior art. In one method, the flow of current to the induction motor is interrupted for braking to permit the motor to slow down naturally owing to mechanical loss attributed to the load. In the other method, the slip which occurs at deceleration is suitably controlled and is allowed to dissipate within the motor. The first method, however, requires too much time to achieve the speed reduction and has a very poor control response, while the second method causes the motor to overheat to such an extent that it cannot endure frequent increases and decreases in speed.

In another method, the rotational energy of the rotor is dissipated by allowing a smoothing capacitor, inserted in the inverter circuitry mentioned above, to charge until the charged voltage exceeds a specified value, whereupon the capacitor is discharged through a braking resistor connected in parallel with the inverter circuit, thereby to dissipate the energy. This method is disadvantageous because it may lead to destruction of the apparatus if the smoothing capacitor is charged to an excessively large voltage, and because costs are raised since the braking resistor increases in size and expense in accordance with the size of the machine to be driven by the motor. Moreover, the method is undesirable in terms of enhancing efficiency because of the fact that the braking energy is wasted in the form of thermal loss.

Regenerative braking systems, as shown in FIGS. 1(A) and 1(B), have been proposed in an effort to improve upon the foregoing arrangements.

FIG. 1(A) is a circuit diagram showing an induction motor operation control apparatus of the regenerative braking type according to the prior art. The apparatus includes a three-phase induction motor 1, a full-wave rectifier 2 constructed of diodes $D_1$ through $D_6$ for rectifying the U, V and W phases of the AC input power, a regenerative circuit 3 having a thyristor bridge comprising thyristors $S_1$ through $S_6$, a smoothing circuit 4 having a smoothing capacitor $C_1$, a variable voltage-variable frequency inverter 5 composed of transistors $TA_1$ through $TA_6$, a rectifier 6 comprising diodes $D_1'$ through $D_6'$, and a step-up transformer for boosting the power source voltage.

To control the induction motor 1 with this conventional arrangement, for example, to decelerate the motor, the commanded speed is reduced in magnitude so that the synchronous speed becomes smaller than the motor speed, giving rise to a negative slip condition. Accordingly, the motor operates in the regenerative braking region, with the result that the voltage induced in the motor is rectified by the rectifier 6, thereby raising the voltage on the DC line side. The smoothing capacitor $C_1$, in order for it to exhibit the smoothing function, is charged to a voltage that is 1.3 to 1.4 times the AC power supply voltage even when the motor is operating in the normal driving mode. Nevertheless, when the induction motor is operated in the regenerative region, the smoothing capacitor $C_1$ is charged to, and held at, an even higher voltage. For example, if the AC power supply voltage is 200 volts, the voltage to which the capacitor $C_1$ is charged is raised to approximately 290 volts. When the firing of the regenerative thyristor bridge 3 is controlled under such conditions, commutation cannot take place and regenerative operation becomes impossible even though it may be possible to fire the thyristors because the AC power supply voltage is lower than the voltage on the side of the DC line. In other words, since the thyristors $S_1$ through $S_6$ are forward biased, a thyristor which has already fired cannot be turned off, making regeneration impossible. To avoid this problem, the step-up transformer 7 is inserted between the AC power supply and the thyristor bridge 3, and the circuitry is arranged in such a manner that there will always be intervals in which the AC power supply voltage is higher than the voltage on the DC line side, thereby assuring commutation of the thyristors $S_1$ through $S_6$ and enabling operation in the regenerative braking region. However, the apparatus that employs this system is large in size and high in price owing to the need for the step-up transformer 7 of a large capacity.

In view of the foregoing drawback, the Inventors have previously proposed a system, illustrated in FIG. 1(B), which dispenses with the step-up transformer. In the proposed system, two switching transistors $TR_1$, $TR_2$ are connected in series with a thyristor bridge 31 and are turned off when any of the thyristors $S_1$ through $S_6$ commutes. This switching action severs the thyristors $S_1$ through $S_6$ from the lines A, B. Thus, overcoming the forward biased state of the thyristors so that commutation is assured.

While the previously proposed system is extremely effective, it does not take into account a situation where the voltage of the smoothing capacitor $C_1$ (FIG. 1(A)) may rise owing to a substantial increase in regenerative energy. That is, when the regenerative energy becomes large in magnitude, the voltage developed by the smoothing capacitor $C_1$ rises and there is a gradual increase in the regenerative current $I_R$. This can damage the switching transistors $TR_1$ $TR_2$ or the thyristors $S_1$ through $S_6$ if the regenerative current $I_R$ exceeds an allowable limit. When such an arrangement is applied to the system of FIG. 1(A), the voltage of the smoothing capacitor $C_1$ is monitored and an alarm signal is issued with said voltage reaches a dangerous level, which is preset. The alarm signal completely halts the operation of the regenerative circuit 3 and transistor inverter 6, with the result that the motor can no longer run from that point onward.

SUMMARY OF THE INVENTION

The present invention discloses an induction motor control system for controlling an induction motor during regenerative braking.

An object of the present invention is to provide a novel induction motor control system of the type having a regenerative circuit and a smoothing capacitor provided between an AC rectifying circuit and a transistor inverter for converting DC voltage into a signal of a variable voltage and frequency to drive an induction motor. This control system enables the motor to continuously run by employing an arrangement wherein the operation of the control circuitry is not brought to a complete stop even if the terminal voltage of the capacitor exceeds a reference value during regenerative braking.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1(A) is a circuit diagram of a priorart apparatus for controlling the operation of an induction motor, which apparatus includes a regenerative braking device comprising a thyristor bridge, and which requires the use of a step-up transformer;

FIG. 1(B) is a circuit diagram of a regenerative circuit having switching transistors, as previously proposed by the inventors;

DESCRIPTION OF THE PREFERRED EMBODIMENT

Figure 2:
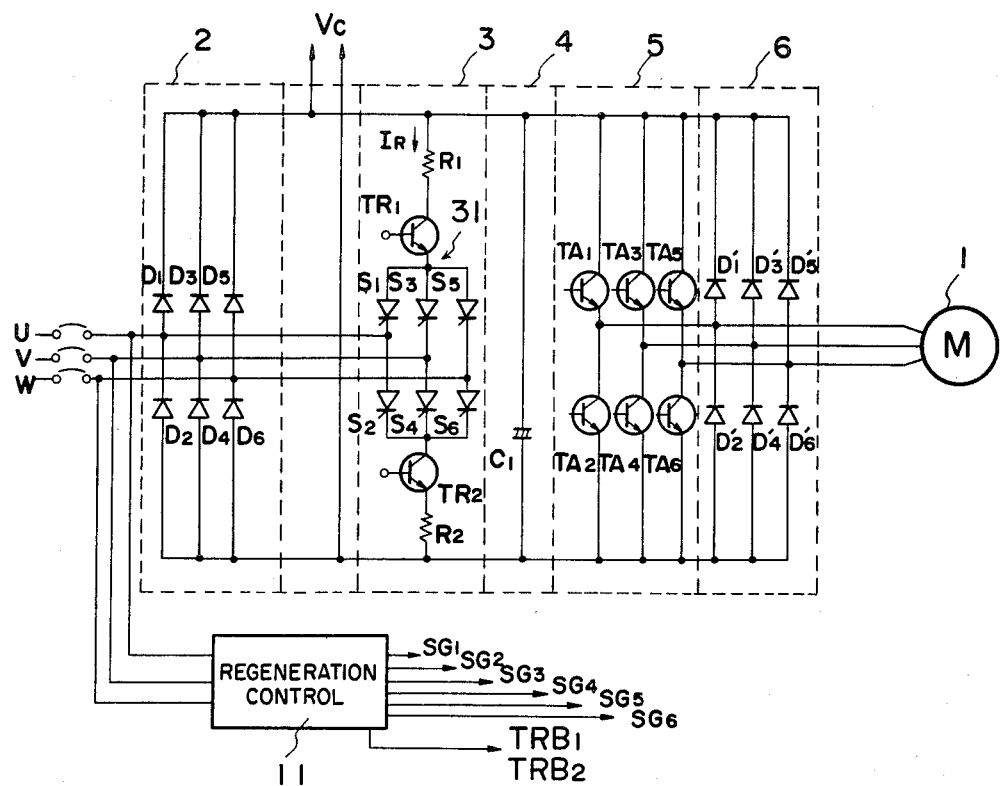
FIG. 2 (C) is a block wiring diagram of a circuit for realizing the control system of the present invention, which circuit is adapted to produce control signals for controlling the transistor inverter of FIG. 2(A)
Figure 3:
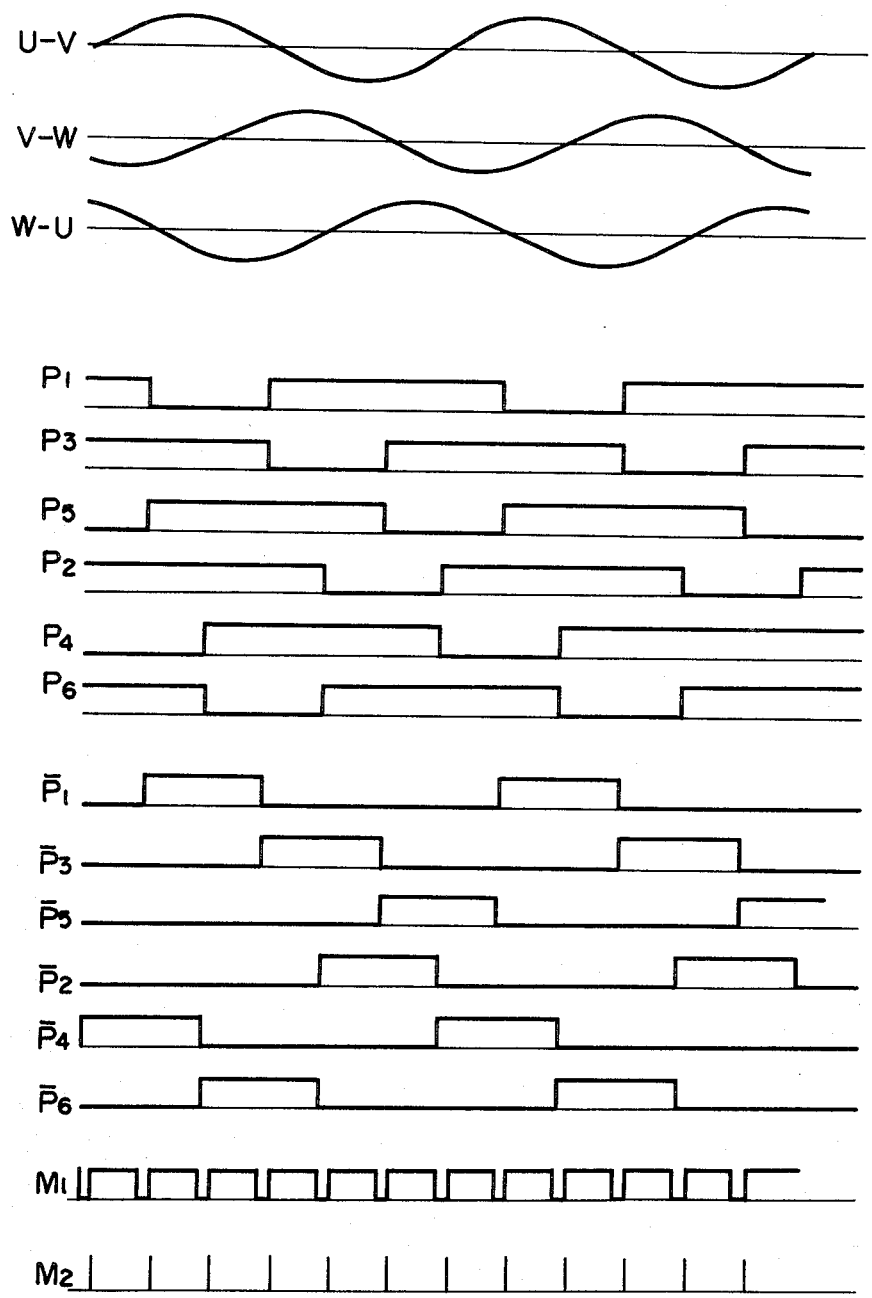
FIGS. 3(A) and 3(B) are waveform diagrams used in explaining various circuit operations based upon the action of the regeneration control circuit of FIG. 2(B).

Referring to FIG. 2(A), reference numeral 11 denotes a regeneration control circuit which generates control signals $SG_1$ through $SG_6$ for controlling the firing of thyristors $S_1$ through $S_6$ constituting the thyristor bridge 31, and which further generates on/off control signals $TRB_1$, $TRB_2$ for controlling the switching transistors $TR_1$, $TR_2$. More specifically, the regeneration control circuit 11 receives the three-phase alternating voltage of the power supply and is adapted to fire the thyristors connected to the two phases that develop the largest interphase voltage. To accomplish this, the regeneration control circuit 11 generates the firing control signals $SG_1$ through $SG_6$. These signals are pulse pairs spaced apart by $T/6$ (where T is the period of the alternating current), a pair of the pulses being produced in successive fashion at intervals of $T/6$, as shown in FIG. 3(B). The regeneration control circuit 11 further produces the control signals $TRB_1$, $TRB_2$ in sync with commutation timing. Although this will be discussed in further detail later, the regeneration control circuit 11 can be constructed through use of circuitry previously disclosed by the Inventors in Japanese Patent Application No. 54-104443.

Figure 2B:
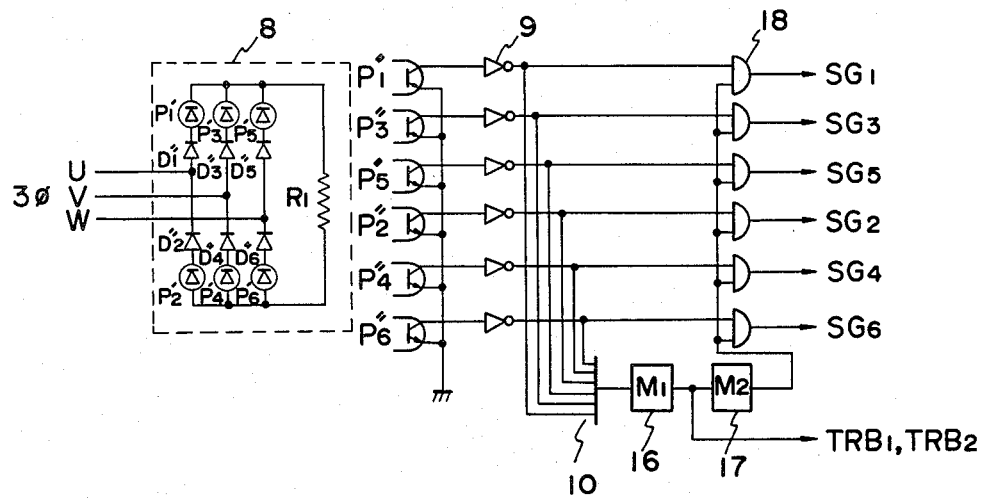
FIG. 2(B) is a block wiring diagram of a regeneration control circuit previously proposed by the Inventors.
Figure 2C:
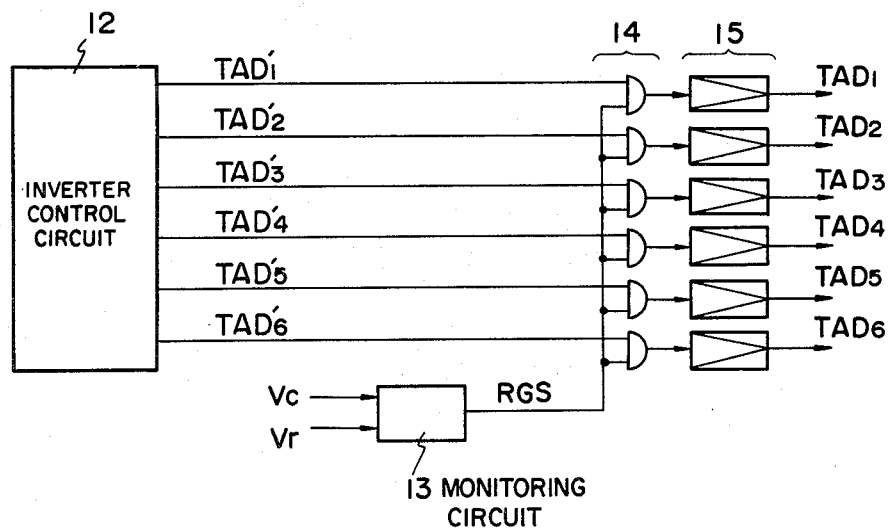
FIG. 2(A) is a block wiring diagram of a first embodiment of an induction motor control system according to the present invention.

In FIG. 2(C), reference numeral 12 denotes an inverter control circuit for controlling the timing of each of the transistors $TA_1$ through $TA_6$ constituting the transistor inverter 5. The inverter control circuit 12 produces transistor drive signals $TAD_1'$ through $TAD_6'$ in response to which the transistor inverter 5 supplies the induction motor 1 with a three-phase primary voltage of a frequency and effective value in conformance with the error or deviation between a commanded rotational speed and the actual rotational speed of the motor. As the inverter control circuit 12 is one widely employed in the art, the details of the circuit will not be described here. A monitoring circuit 13 is provided to monitor the terminal voltage $V_C$ of the smoothing capacitor $C_1$. The monitoring circuit 13 compares the magnitudes of its two inputs, namely the terminal voltage $V_C$ and a reference voltage $V_r$, and produces a signal RGS whose level is low (logical "0") when the condition $V_C \geq V_r$ holds, and high (logical "1") when the condition $V_C < V_r$ holds. A group of AND gates 14 takes the AND of the signal RGS and each of the transistor drive signals $TAD_1'$ through $TAD_6'$. The outputs of the AND gates 14 are connected to respective amplifiers 15 for producing drive signals $TAD_1$ through $TAD_6$, respectively.

In the operation of the apparatus of the present invention having the foregoing construction, when the induction motor 1 is running in the ordinary driving mode, each phase of the AC power supply is rectified into a direct current by the rectifier 2. The transistor inverter 5 converts the direct current into an alternating current of a prescribed frequency and voltage which is applied to the induction motor 1 to bring the motor speed into agreement with the commanded speed. The output frequency of the inverter 5 is capable of being varied by adjusting the repetition frequency of the drive signals $TAD_1$ through $TAD_6$ for driving the transistors $TA_1$ through $TA_6$ constituting the inverter, and the output voltage of the inverter is capable of being varied by adjusting the conduction time of the transistors $TA_1$ through $TA_6$. When a deceleration command signal is issued, such as when it is required to decelerate the motor in accordance with the load conditions, the induction motor starts to operate in the region of negative slip S, that is, in a regenerative braking region, since the rotational speed of the running motor is greater than the synchronous speed. The output of the motor consequently is rectified by the rectifier 6 and raises the voltage on the DC line side. If the motor is operating at an AC power supply voltage of 200 volts, then the voltage at the terminals of the smoothing capacitor $C_1$ will be raised to approximately 290 volts. As described above, in accordance with a feature of the present invention, the switching transistors $TR_1$, $TR_2$ are connected in series with the thyristor group of the regenerative circuit 3. Generally, these transistors are conductive during regenerative operation, and are momentarily non-conductive when any of the thyristors $S_1$ through $S_6$ is to commute, thereby interrupting the flow of current to the thyristors. The transistors $TR_1$, $TR_2$ are rendered conductive again upon taking into account the time during which the thyristors are completely extinguished. Even if the voltage on the DC line side should happen to be higher than the AC voltage of the power supply, therefore, the regenerative current $I_R$ will always be fed back to the power supply without any of the thyristors experiencing commutation failure.

Reference will now be had to FIG. 2(B) to describe the construction and regenerative action of the regeneration control circuit 11 previously proposed by the Inventors.

As shown in FIG. 2(B), numeral 8 denotes one of the two sections constituting a photocoupler, the other section being made up of such elements as a group of photo-transistors $P_1''$ through $P_6''$, which will be described below. The photocoupler 8 includes elements such as light-emitting diodes $P_1'$ through $P_6'$ and diodes $D_1''$ through $D_6''$, these being connected in the form of a bridge circuit whose AC input side receives the three-phase AC power for the motor, namely the U, V and W phases, in a phase relationship which corresponds to that received by the respective thyristors in the thyristor bridge of the regenerative circuit 3. The diodes $D_1''$ through $D_6''$ serve also to protect the circuit against reverse voltages. $P_1''$ through $P_6''$ designate phototransistors or the like, as mentioned above. The arrangement is such that when light-emitting diode $P_1'$ emits light in response to an inflow of current, the element $P_1''$, serving as a light receptor, is rendered conductive upon intercepting the emitted light. The output terminal of each element $P_1''$ through $P_6''$ is provided with an inverter for inverting the output signal. The output signals from all of the inverters 9 are applied to an OR circuit 10 whose output is in turn coupled to a first monostable multivibrator 16 for generating negative pulses of a fixed duration. A second multivibrator 17 responds to the output of the first monostable multivibrator 16 to produce pulses of a fixed duration. The AND gates 18 perform the logical AND between the outputs of the respective inverters 9 and the output of the second monostable multivibrator 17. There are the same number of AND gates 18 as there are inverters 9. The outputs of the AND gates 18 are gating signals $SG_1$ through $SG_6$, namely the firing control signals mentioned earlier, which are applied to the gates of the corresponding thyristors $S_1$ through $S_6$ that form the regenerative thyristor bridge 3. The pulses produced by the first monostable multivibrator 16 are base signals $TRB_1$, $TRB_2$, namely the aforementioned control signals, and are applied simultaneously to the switching transistors $TR_1$, $TR_2$ connected in series with the thyristor group in the thyristor bridge 3.

Described next will be the formation of the control signals by means of the regeneration control circuit 11 having the foregoing construction.

The input side of the bridge circuit 8, comprises the light-emitting diodes elements $P_1'$ through $P_6'$ for constructing a photocoupler, and is connected to the U, V and W-phases of the motor driving source. With such a connection, the bridge circuit 8 receives the same interphase voltages as does the regenerative thyristor bridge 3 so that, from among the thyristors constituting the thyristor bridge 3, it is possible to detect the particular thyristor corresponding to that phase in which firing must be executed to achieve regenerative action. For a better understanding of this operation, reference will be had to FIG. 3(A). Sinusoidal interphase voltages U-V, V-W, W-U are impressed upon the corresponding phase input terminals of the bridge that forms the photocoupler. A current flows only into those light-emitting diodes that receive the largest interphase voltage of the interphase voltages that are applied, these diodes respond by emitting light for the duration of the current flow. The light-emitting diodes $P_1'$ through $P_6'$ are excited in succession in accordance with the temporal variation of the interphase voltages. The other photocoupler section, namely the section comprising photo-transistors $P_1''$ through $P_6''$ serving as the light receptors, is arranged so as to intercept the light from the light-emitting diodes. Hence, when a light-emitting diodes is excited and caused to emit light, the corresponding photo-transistor intercepts the light and is rendered conductive, its collector potential going to zero volts and remaining there for as long as the element continues to receive light. The outputs of the photo-transistors are illustrated by the waveforms $P_1$ through $P_6$ in FIG. 3(A). These signals are inverted to produce signals $\overline{P_1}$ through $\overline{P_6}$ by means of the inverters 9 connected to the output of each photo-transistor. The inverted signals are applied to one input terminal of each of the corresponding AND gates 18, and to the input side of the OR gate 10. Accordingly, the OR gate 10 delivers pulses successively to the monostable multivibrator 16, a pulse being produced by the OR gate for each pulse in the signals $\overline{P_1}$ through $\overline{P_6}$. The monostable multivibrator 16 is triggered by the leading edge of each received pulse and is rendered conductive only for a fixed period of time after which the output of the multivibrator returns to its original state. This operation continues in repetitive fashion to produce the pulse train shown by $M_1$ in FIG. 3(A). The pulse train has a potential of zero volts for intervals of about 0.5 milliseconds (conduction interval), and is applied to the bases of the switching transistors $TR_1$, $TR_2$ connected in series with the regenerative thyristor bridge. Thus, the base potentials of the transistors are driven to zero volts to render the transistors non-conductive. In addition, the pulse train $M_1$ is applied to the second monostable multivibrator 17 which is triggered to produce the pulse train illustrated by $M_2$ is FIG. 3(A). The pulses are positive pulses having a width of approximately 10 microseconds, and they are timed by the leading edge of each pulse in signal $M_1$; that is, each time the signal $M_1$ returns to its original potential. The positive (i.e., logical "1") pulses in pulse train $M_2$ are applied to each of the AND gates 18. The AND gates 18 perform the logical AND between the signals $\overline{P_1}$ through $\overline{P_6}$, and the output pulses $M_2$ from the second monostable multivibrators 17, thereby producing the firing signals $SG_1$ through $SG_6$ which are delivered to the respective gates of the thyristors $S_1$ through $S_6$ that construct the regenerative thyristor bridge. The phase relationship among the signals $SG_1$ through $SG_6$, shown in FIG. 3(B), is of course governed by the output signals $P_1$ through $P_6$ of the photocoupler.

Accordingly, assume that the U-V phases of the AC power supply exhibit the largest interphase voltage suitable for regeneration. When the zero-potential pulses TRB₁, TRB₂ of FIG. 3(B) are applied to the switching transistors TR₁, TR₂, the transistors are rendered non-conductive simultaneously to temporarily cut off the flow of current to the thyristor bridge 3, thereby turning off all of the thyristors S₁ through S₆. After this occurs the firing signals are re-applied to the gates of thyristors S₁ and S₄ which are fired into conduction as a result, whereby energy is returned by a regenerative current $I_R$ which flows from the U-phase of the power supply to the V-phase thereof. After a prescribed time period the zero-potential pulses are re-applied to the switching transistors TR₁, TR₂ to again render them non-conductive, thereby temporarily turning off all of the transistors in the regenerative thyristor bridge 3 once again. When this has been achieved the switching transistors are driven into conduction again, and firing signals are applied to the thyristors S₁, S₆ simultaneously. As a result, a regenerative current flows from the U-phase into the W-phase. This operation continues in similar fashion. That is, all of the thyristors are turned off by rendering both switching transistors TR₁, TR₂ non-conductive as a result of applying the zero-potential pulses thereto prior to the commutation of the thyristors and, in successive fashion, the firing signals SG₂, SG₆ are applied to the thyristors S₂, S₆, the firing signals SG₃, SG₂ are applied to thyristors S₃, S₂, and the firing signals SG₅, SG₂ are applied to the thyristors S₅, S₂. As a result, a regenerative current can be supplied to the two phases of the AC power supply that exhibit the largest interphase voltage. Furthermore, commutation is reliable since the thyristors are turned off temporarily prior to being fired due to the thyristor current being interrupted without fail by means of the switching transistors TR₁, TR₂. The conductive states of thyristors S₁ through S₆, as well as the waveform of the regenerative current $I_R$, are illustrated by S₁ through S₆ and by $I_R$, respectively, in FIG. 3(B).

When the regenerative energy takes on a large value, all of the energy cannot be returned to the power supply. This causes a gradual rise in the terminal voltage $V_C$ of the smoothing capacitor C₁. As a result, there is also an increase in the regenerative current $I_R$, as given by the following equation:

$$I_R = (V_C - V_{AC})/(r_1 + r_2)$$

where $V_C$ is the terminal voltage of the smoothing capacitor C₁, $V_{AC}$ the effective value of the power supply voltage, and $r_1$, $r_2$ the magnitudes of the resitors R₁, R₂, respectively, connected in series with the switching transistors TR₁, TR₂. The terminal voltage $V_C$ is compared against the reference voltage $V_r$ in monitoring circuit 13, as described earlier. If the regenerative energy increases to such an extent that $V_C \geq V_r$ holds, then the output signal RGS of monitoring circuit 13 will be logical "0". As a result, the outputs of all AND gates 14 will be logical "0", causing all of the drive signals TAD₁ through TAD₆ to be logical "0". This cuts off all of the transistors TA₁ through TA₆ in the transistor inverter 5, whereby the inverter ceases to function. When this occurs, the regenerative energy cannot be returned to the power supply. Instead, the energy stored in the smoothing capacitor C₁ is returned to the power supply through the regenerative circuit 3, so that the terminal voltage $V_C$ gradually decreases to establish the condition $V_C < V_r$. This condition causes the signal RGS goes to logical "1", restoring the transistor inverter 5 to the operable state so that the regenerative energy may once again be returned to the power supply. Thereafter the foregoing operations are repeated, with either the regenerative energy being returned to the power supply or the transistor inverter 5 being temporarily disabled (during which time the energy stored in the smoothing capacitor C₁ is dissipated), in accordance with the magnitudes of $V_C$ and $V_r$.

In the case described above, the transistor inverter 5 is disabled when the terminal voltage $V_C$ of the smoothing capacitor C₁ exceeds the preset reference voltage $V_r$, and is restored to operation when $V_C$ is less than $V_r$. Alternatively, however, it is possible to control the transistor inverter 5 by detecting the regenerative current $I_R$. This can be carried out by detecting the terminal voltage of resistor R₁ or R₂, or by providing a current transformer in series with the switching transistor TR₁.

In accordance with the present invention as described above, an induction motor can continue to run even if the terminal voltage of the smoothing capacitor exceeds a preset danger level. The result is a great improvement in the reliability of the induction motor operation.

As many apparently widely different embodiments of the present invention can be made without departing from the spirit and scope of this invention. It is to be understood that the invention is not limited to the specific embodiments thereof except as defined in the appended claims.

What we claim is:

1. An induction motor control system, for controlling the actual speed of an induction motor in accordance with a commanded speed, the system having a braking mode in which a regenerative current is generated, and comprising:
   a rectifier connectable to an AC power supply for converting alternating current into direct current;
   a transistor inverter including a pluarlity of transistors operatively connected to receive the direct current and connectable to the induction motor, for converting the direct current into three-phase AC signals for driving the induction motor and having a voltage and frequency in conformance with a deviation between the commanded speed and the actual speed of the induction motor;
   an inverter control circuit operatively connected to the transistor inverter, for providing switching signals for controlling the switching action of the plurality of transistors comprising the transistor inverter;
   a regenerative circuit connectable to the AC power supply including a plurality of switching elements, the regenerative circuit being connected in parallel with the transistor inverter for controlling the flow of the regenerative current during braking;
   a smoothing capacitor operably connected in parallel with the transistor inverter and to receive the direct current;
   a regeneration control circuit connectable to the AC power supply and operatively connected to the regenerative circuit, for controlling the regenerative circuit switching elements; and
   detecting means operatively connected to the smoothing capacitor, and between the inverter control circuit and the transistor inverter for detecting one of the magnitude of the smoothing capacitor voltage and the magnitude of the regenerative current, for temporarily disabling the transistor inverter when the one of the magnitude of said smoothing capacitor voltage and said regenerative current exceeds a predetermined value, and for enabling the transistor inverter when the one of the magnitude of said smoothing capacitor voltage and said regenerative current drops below said predetermined value.

2. An induction motor control system according to claim 1, wherein the detection means comprises:

comparison means for comparing the magnitude of one of the smoothing capacitor voltage and the regenerative current, and the predetermined value, and for providing a first control signal responsive to said magnitude of one of the smoothing capacitor voltage and the regenerative current being greater than or equal to the predetermined value;

gating means responsive to said control signal and to said inverter control circuit, for providing gating signals for controlling corresponding ones of the plurality of transistors of the transistor inverter; and amplifying means, operatively connected between the gating means and the transistor inverter, for amplifying the gating signals and for providing the amplified signals to the corresponding ones of the plurality of transistors of the transistor inverter circuit.

3. An induction motor control system according to claim 2, wherein the gating means comprises a plurality of AND gates, each AND gate operatively connected to receive said first control signal and to receive a corresponding one of the switching signals and providing a respective one of the gating signals.

* * * * *